US008280991B2

(12) United States Patent
Cheshire

(10) Patent No.: US 8,280,991 B2
(45) Date of Patent: Oct. 2, 2012

(54) METHOD AND APPARATUS FOR DETECTING INCORRECT RESPONSES TO NETWORK QUERIES

(75) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 947 days.

(21) Appl. No.: 11/445,609

(22) Filed: Jun. 2, 2006

(65) Prior Publication Data

US 2006/0253612 A1    Nov. 9, 2006

(51) Int. Cl.
    *G06F 15/16* (2006.01)
(52) U.S. Cl. ......................................... 709/221; 709/245
(58) Field of Classification Search .................. 709/245, 709/230, 219, 229, 217; 370/241, 392, 389
    See application file for complete search history.

(56) References Cited

U.S. PATENT DOCUMENTS

| | | | |
|---|---|---|---|
| 5,708,654 A | 1/1998 | Arndt et al. | 370/242 |
| 5,724,510 A | 3/1998 | Arndt et al. | 395/200.5 |
| 6,041,324 A * | 3/2000 | Earl et al. | 1/1 |
| 6,324,582 B1* | 11/2001 | Sridhar et al. | 709/230 |
| 6,332,158 B1* | 12/2001 | Risley et al. | 709/219 |
| 7,197,574 B1* | 3/2007 | Ishiyama | 709/245 |
| 7,315,543 B2* | 1/2008 | Takeuchi et al. | 370/392 |
| 7,415,536 B2* | 8/2008 | Nakazawa | 709/245 |
| 7,426,576 B1* | 9/2008 | Banga et al. | 709/245 |
| 7,529,852 B2* | 5/2009 | Satapati | 709/245 |
| 7,680,104 B2* | 3/2010 | Shore | 370/389 |
| 2002/0138634 A1* | 9/2002 | Davis et al. | 709/229 |
| 2004/0233916 A1* | 11/2004 | Takeuchi et al. | 370/395.54 |
| 2005/0095967 A1* | 5/2005 | Pan | 451/357 |
| 2005/0198386 A1* | 9/2005 | Accapadi et al. | 709/245 |
| 2005/0220106 A1* | 10/2005 | Raverdy et al. | 370/392 |
| 2005/0235044 A1* | 10/2005 | Tazuma | 709/217 |
| 2005/0267978 A1* | 12/2005 | Satapati | 709/230 |
| 2006/0056418 A1* | 3/2006 | Rizzuto et al. | 370/395.52 |
| 2006/0095967 A1* | 5/2006 | Durham et al. | 726/23 |
| 2006/0146816 A1* | 7/2006 | Jain | 370/389 |
| 2006/0176822 A1* | 8/2006 | Doyle et al. | 370/241 |

OTHER PUBLICATIONS

"mDNSRespon", 2004-2006, Apple Computer, Open Source Code. pp. 61-62. http://www.opensource.apple.com/source/mDNSResponder/mDNSResponder-164/mDNSCore/uDNS.c.*

"uDNS.c" 2002-2004, Apple Computer, Open Source Code. pp. 58-59. http://www.opensource.apple.com/source/mDNSResponder/mDNSResponder-108.6/mDNSCore/uDNS.c.*

(Continued)

*Primary Examiner* — Ian N Moore
*Assistant Examiner* — Thai Nguyen
(74) *Attorney, Agent, or Firm* — Park, Vaughan, Fleming & Dowler LLP

(57) ABSTRACT

A system that determines if a DNS server suffers from a particular known functional limitation. During operation, the system sends an exploratory query to the DNS server, wherein the exploratory query is specially constructed so as to detect the existence of a functional limitation in the DNS server without causing the DNS server to fail. Next, the system receives an answer to the exploratory query from the DNS server. If the DNS server gives an incorrect response, the system can take actions as may be desired for the implementation. For example, the system may display a message identifying the functional limitation, or the system may establish a mode of operation where it avoids performing those types of DNS queries known to present a risk of crashing the particular Internet gateway.

22 Claims, 2 Drawing Sheets

OTHER PUBLICATIONS

"Dynamic Configuration of IPv4 Link-Local Addresses", by Stuart Cheshire et al., The Internet Society 2004, Jul. 8, 2004, Zeroconf Working Group, Internet-Draft, <draft-ietf-zeroconf-ipv4-linklocal-17.txt>.

* cited by examiner

METHOD AND APPARATUS FOR DETECTING INCORRECT RESPONSES TO NETWORK QUERIES

RELATED APPLICATION

This application is related to a pending U.S. patent application, entitled "Method and Apparatus for Detecting a Router that Improperly Responds to ARP Requests," by inventors Stuart D. Cheshire and Joshua V. Graessley, having Ser. No. 11/098,135 and a filing date of 4 Apr. 2005.

BACKGROUND

1. Field of the Invention

The present invention relates to techniques for detecting incorrect responses to network queries. More specifically, the present invention relates to a method and apparatus for using a test query to detect whether an Internet gateway device's configured domain-name system (DNS) server incorrectly responds to network queries.

2. Related Art

Internet Service Providers (ISPs) typically provide a single Internet Protocol (IP) address per Internet connection account, which would conventionally imply that only one Internet-enabled device per account can be coupled to the ISP's network at any given time. This is unfortunate, given that today many households have multiple computers and other Internet-enabled devices that the customer may desire to have connected to the ISP's network concurrently.

A common solution to this Internet connection-sharing problem is to use a Network Address Translation (NAT) device (commonly called an "Internet gateway") to share a single IP address with multiple Internet-enabled devices, which are coupled to the Internet gateway through a local area network (LAN). Note that an Internet gateway can include wired Internet gateways and wireless Internet gateways. Furthermore, note that the Internet gateway can be implemented in a number of ways, including but not limited to: (1) a desktop or a laptop computer system coupled to the Internet, which is configured to share the Internet connection with devices on the LAN; or (2) a standalone device coupled to the Internet, which is configured to share the Internet connection with devices on the LAN. The Internet gateway device typically has at least two physical interfaces and two Internet addresses: a public one that is used to communicate with the ISP's network, and a private internal one that is used to communicate with devices on the LAN. From the point of view of an outside observer, all the customer's local computers and other Internet-enabled devices are made to appear as a single device with a single public IP address.

If the Internet gateway is configured to offer Dynamic Host Configuration Protocol (DHCP) service to the customer's devices, the Internet gateway usually assigns a private IP address to each Internet-enabled device coupled to the Internet gateway. The Internet gateway also provides its own LAN IP address to these Internet-enabled devices as both the default gateway to which they should send outbound IP packets, and the default DNS server to which they should send DNS queries. Since usually the Internet gateway is not, itself, authoritative for any DNS domains, all it does with received DNS queries is forward them on to a more knowledgeable DNS server elsewhere, typically one operated by the customer's ISP.

When communicating with services on the Internet, a client device sends IP packets via the Internet gateway. The Internet gateway rewrites the source IP address in each packet to be the common shared public IP address, and then forwards it through the ISP's network to the Internet. During this process, the Internet gateway typically keeps track of which packet was sent by which local Internet-enabled device, so that when response packet(s) return from the Internet via the ISP's network to the Internet gateway, the Internet gateway is able to route those response packets to the appropriate Internet-enabled device that originated the corresponding outgoing request packet.

For example, FIG. 1 illustrates an Internet gateway 104, which is coupled both to network 102 and local network 106. Local network 106 couples Internet gateway 104 with computers 108, 110, and 112, and Ethernet device 114. Network 102 can generally include any type of wired or wireless communication channel capable of coupling together computing nodes. This includes, but is not limited to, a local area network, a wide area network, or a combination of networks, such as the Internet.

An Internet gateway (or any other Internet sharing device) such as Internet gateway 104, typically includes a mechanism for forwarding DNS queries to DNS servers which can provide answers to the DNS queries. This mechanism allows Internet gateway 104 to function as the default "configured DNS server" for all devices on local network 106.

Note that a "configured DNS server" can include any DNS-enabled device which can return a response to a DNS query, such as (1) an authoritative DNS server, (2) a recursive DNS server, and (3) a forwarding DNS server. An authoritative DNS server answers DNS queries directed to a domain or a set of domains that have been delegated to the authoritative DNS server. In doing so, the authoritative DNS server maintains DNS records for the delegated domain or set of domains, and is the only type of DNS server that can answer authoritatively for the delegated domain or set of domains.

A recursive DNS server (a DNS cache) receives DNS queries, and performs queries to lookup the requested domain. When an answer is received from an authoritative DNS server or from another recursive DNS server, the recursive DNS server caches the answer in its local DNS cache. If a query is made for a DNS record which was previously-cached in the local DNS cache, the recursive DNS server uses the cached information to answer the DNS query instead of performing another DNS query.

A forwarding DNS server (a DNS relay) forwards DNS queries to either a recursive DNS server or to an authoritative DNS server. As mentioned above, Internet gateways typically contain simple DNS relays, which function as the "configured DNS server" for local devices that communicate through the Internet gateway.

Although Internet gateways are typically able to enable multiple Internet-enabled devices to share a single Internet connection successfully, some of these Internet gateways have functional limitations. One such functional limitation causes the Internet gateway to incorrectly handle the forwarding of valid DNS queries to DNS servers. Furthermore, such functionally-limited Internet gateways can crash and completely cease functioning when processing certain valid DNS queries, thereby disrupting their ability to perform their intended function, namely providing Internet access to local computers and similar Internet-enabled devices.

Hence, what is needed is a method and an apparatus to determine if a configured DNS server suffers from this particular known functional limitation so that the client can determine when it should avoid performing those certain valid DNS queries that are known to have a high likelihood of crashing that particular device.

SUMMARY

One embodiment of the present invention provides a system that determines if a DNS server suffers from a particular known functional limitation. During operation, the system sends an exploratory query to the DNS server, wherein the exploratory query is specially constructed so as to detect the existence of a functional limitation in the DNS server without causing the DNS server to fail. Next, the system receives an answer to the exploratory query from the DNS server. If the DNS server gives an incorrect response, the system can take actions as may be desired for the implementation. For example, the system may display a message identifying the functional limitation, or the system may establish a mode of operation where it avoids performing those types of DNS queries known to present a risk of crashing the particular Internet gateway.

In a variation on this embodiment, if the answer does not indicate that a functional limitation exists, the system concludes that the DNS server does not have the functional limitation that the special query was constructed to detect.

In a variation on this embodiment, the DNS server can include: a DNS server, a DNS cache, or a DNS relay.

In a further variation, the exploratory query is constructed so as to not cause the DNS server to communicate with a DNS root name server whether or not the functional limitation exists.

In a further variation, the special query is a "reverse-lookup" DNS query for a name that is a sub-domain of the "reverse-lookup" DNS name for the IP loopback address.

In a further variation, the exploratory query is for a name that should be known locally by the DNS server to have no records, without recourse to outside authority.

In a further variation, the format for the exploratory query is for the name "1.0.0.127.dnsbugtest.1.0.0.127.in-addr.arpa."

In a further variation, if the answer to the exploratory query indicates that a domain name specified in the exploratory query does not exist, the system concludes that the DNS server does not have the functional limitation that the exploratory query was constructed to detect.

In a variation on this embodiment, the remedial action involves disabling a networking feature in an application which would cause it to issue DNS queries that have the potential to crash the DNS server.

In a further variation, the networking feature is Wide Area Bonjour, which allows clients to discover network services on a network.

One embodiment of the present invention provides a computer-readable storage medium storing instructions that when executed by a computer cause the computer to perform a method for determining if a domain name system (DNS) server is functionally-limited. When executed, the instructions cause the computer to send an exploratory query to the DNS server, wherein the exploratory query is specially constructed so as to detect the existence of a functional limitation in the DNS server without causing the DNS server to crash or otherwise fail in a disruptive manner. The instructions then configure the computer to receive an answer to the exploratory query from the DNS server. If the answer indicates that a functional limitation exists in the DNS server, the instructions cause the computer to perform a remedial action.

One embodiment of the present invention provides a method for determining if a domain name system (DNS) server is functionally-limited. During operation, the method sends an exploratory query to the DNS server, wherein the exploratory query is specially constructed so as to detect the existence of a flaw functional limitation in the DNS server without causing the DNS server to fail. Next, the method receives an answer to the exploratory query from the DNS server. If the answer indicates that a flaw functional limitation exists in the DNS server, the method performs a remedial action.

One embodiment of the present invention provides a system that tests a domain-name (DNS) server to determine if the DNS server exhibits a functional limitation. During operation, the system transmits a test query to the DNS server, wherein the test query is constructed to prompt a first response if the functional limitation exists on the DNS server, and a second response if the functional limitation does not exist on said DNS server. Next, the system receives a response to the test query from the DNS server. The system then determines whether the functional limitation exists on the DNS server.

One embodiment of the present invention provides a system that evaluates the response of a local area network (LAN) domain-name server (DNS) coupled to a wide-area network (WAN) to a query of a type known to cause an undesired operation in some DNS servers. During operation, the system transmits a test query from a client on the LAN to the LAN DNS server, wherein the query is constructed to generate a first response from the DNS server if the DNS server is of a configuration known to exhibit the undesired operation, and to generate a second response if the DNS server is not of a configuration known to exhibit the undesired response. Next, the system receives the response from the DNS server at a LAN client. The system then determines whether the DNS server is of a type known to exhibit the undesired operation. If so, the system performs a remedial action at the client in response to the determination.

DETAILED DESCRIPTION

Figure 1:
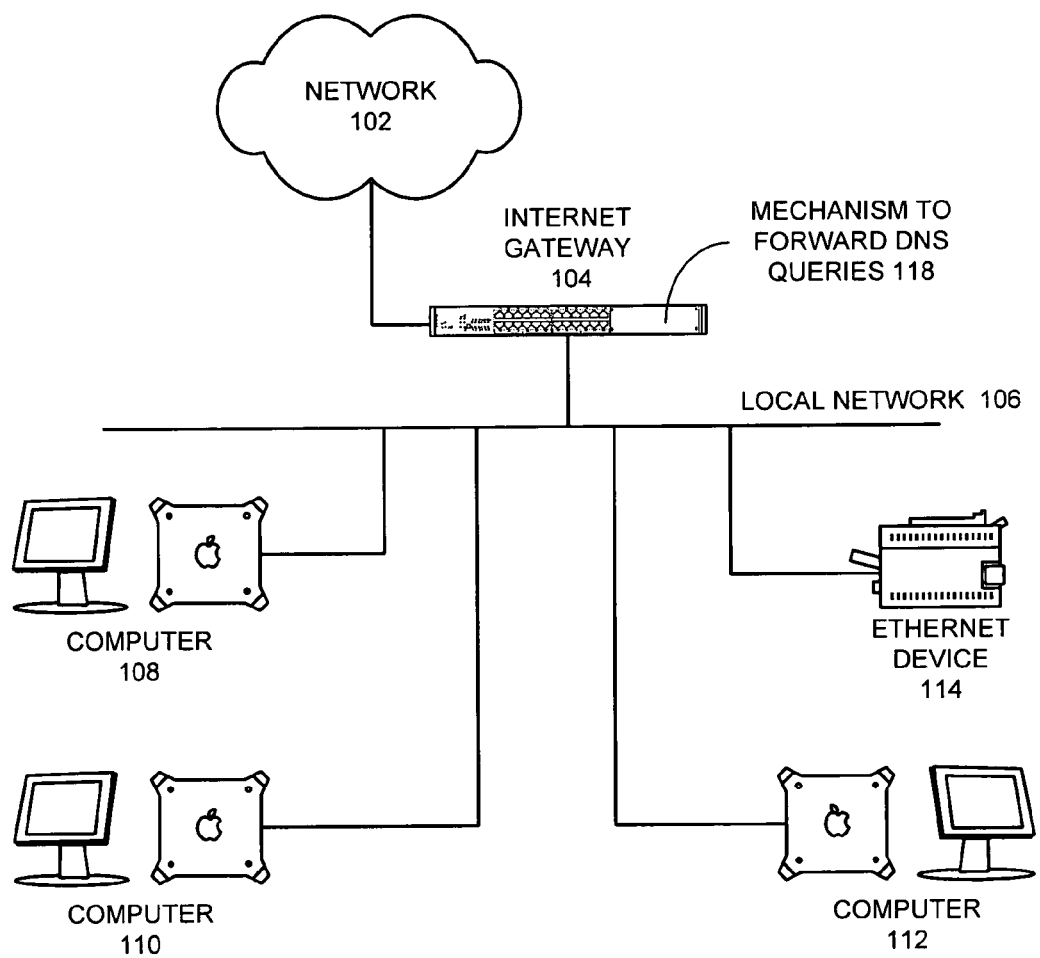
FIG. 1 illustrates an Internet gateway coupled to a network.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Configured DNS Server Functional Limitation

Some configured DNS servers that reside within Internet gateways have functional limitations that can produce incorrect answers or can cause the Internet gateway to crash. (Note that a configured DNS server can include any DNS-enabled device including a DNS server, a DNS relay, or a DNS cache.) Such functionally-limited configured DNS servers assume that if a client performs a PTR-type DNS query, the only possible request the client is making is to perform an IPv4 "reverse lookup" DNS query, translating from an IP address to a name.

An example of a properly-formed IPv4 "reverse-lookup" domain name query is "2.1.168.192.in-addr.arpa." This query and ones like it may be performed by software, or by the user with a DNS utility such as "nslookup". The nslookup command and arguments for this example are: "nslookup -q=ptr 2.1.168.192.in-addr.arpa." In this example, the DNS query type is PTR and the DNS query is "2.1.168.192.in-addr.arpa." Note that a PTR query is frequently a "reverse-lookup" DNS query, which performs a mapping from an IP address to a corresponding domain name. However, other properly-formed DNS queries are possible even though they may not make any sense. For example, the PTR-type DNS query "2.1.168.192.nonsense." is a properly-formed DNS query, but does not yield any answer records since the top-level domain "nonsense" does not actually exist. Note that the domain "in-addr.arpa" is the proper domain suffix to use when performing a "reverse lookup" DNS query.

Some functionally-limited Internet gateways examine only the first four labels of the PTR-type DNS query ("labels" in a domain name are the groups of characters separated by periods) and ignore the remainder of the name. In the "2.1.168.192.nonsense." example, the first four labels are "2.1.168.192." Therefore, for these functionally-limited Internet gateways, the PTR-type DNS query "2.1.168.192.nonsense." is indistinguishable from the PTR-type DNS query "2.1.168.192.in-addr.arpa."

Also note that these same functionally-limited Internet gateways assume that the first four labels are decimal numbers between 0 and 255. If the first four labels of the PTR-type DNS query are not numbers between 0 and 255, these functionally-limited Internet gateways crash. Note that a crash of the Internet gateway can include, but is not limited to the Internet Gateway: failing completely; rebooting; ceasing to respond to network traffic; responding slowly to network traffic; and resetting the configuration of the Internet Gateway.

Detecting a Functionally-Limited Internet Router

One embodiment of the present invention detects such functionally-limited Internet gateways by performing a special DNS query that is constructed to detect the existence of a functional limitation in the configured DNS server without crashing it.

For example, the special query which detects a functional limitation in the Internet gateway's configured DNS server is the PTR-type DNS query "2.1.168.192.nonsense.", which produces a NXDOMAIN answer (i.e. domain does not exist) in a properly functioning Internet gateway without the functional limitation. However, in Internet gateways with functionally-limited configured DNS servers, they will attempt to give a host name in response to the 2.1.168.192.nonsense query, even though the query was not in fact an "in-addr.arpa" name lookup query.

Unfortunately, the PTR-type DNS query "2.1.168.192.nonsense", when directed to a configured DNS server without the above-mentioned functional limitations, causes a DNS query to be sent to one of the DNS root name servers. Since in general the only way for a configured DNS server to know whether or not a particular top-level domain exists is to ask one of the root name servers, every such test query potentially results in a nuisance query being sent to the root name servers.

In one embodiment of the present invention, the special query is constructed so that the configured DNS server does not communicate with a DNS root name server whether or not the functional limitation exists.

For example, the special query can be "1.0.0.127.dnsbugtest.1.0.0.127.in-addr.arpa." In this exemplary query, the address "127.0.0.1" is the "loopback address." The loopback address is a special IP address available for use when two pieces of network software on the same machine want to communicate with each other using IP networking mechanisms and programming interfaces, independent of whether conventional (inter-machine) IP networking is available.

Also note that every DNS server is supposed to contain a fixed DNS record which maps "1.0.0.127.in-addr.arpa." to the name "localhost". Hence, any names that are sub-domains of the name "1.0.0.127.in-addr.arpa." are properly-formed and valid, but are names that are known to have no associated DNS records. In other words, "1.0.0.127.dnsbugtest.1.0.0.127.in-addr.arpa." is a legal name, but any queries for that name should yield no results. Therefore, an Internet gateway with a properly functioning configured DNS server returns an NXDOMAIN answer (i.e. domain name does not exist) without having to communicate with a DNS root name server to make that determination.

Note that since the last six labels in this PTR-type DNS query is "1.0.0.127.in-addr.arpa.", an Internet gateway with a properly functioning configured DNS server will not forward the DNS query to the DNS root name server since the Internet gateway's configured DNS server knows that the IP address is a sub-domain of the loopback address. Since sub-domains of the loopback address are not used, the configured DNS server should respond with an NXDOMAIN answer without communicating with a DNS root name server.

Similarly, an Internet gateway with the functional limitation that the special query is constructed to detect does not communicate with a DNS root name server. Recall that an Internet gateway with a functionally-limited configured DNS server only uses the first four labels of the PTR-type DNS query, and interprets this PTR-type DNS query as the PTR-type DNS query "1.0.0.127.in-addr.arpa." Since the functionally-limited Internet gateway's configured DNS server knows that the correct answer for a PTR-type DNS query for "1.0.0.127.in-addr.arpa." should be "localhost," the Internet gateway returns the answer "localhost" without communicating with any DNS root name server.

Note that since the PTR-type DNS query string using the loopback address does not query the root DNS servers, it is preferable to use this query string format to detect the functional limitation in a DNS server. However, other PTR-type DNS query strings not using the loopback address can also be used to detect the functional limitation in a DNS server.

Figure 2:
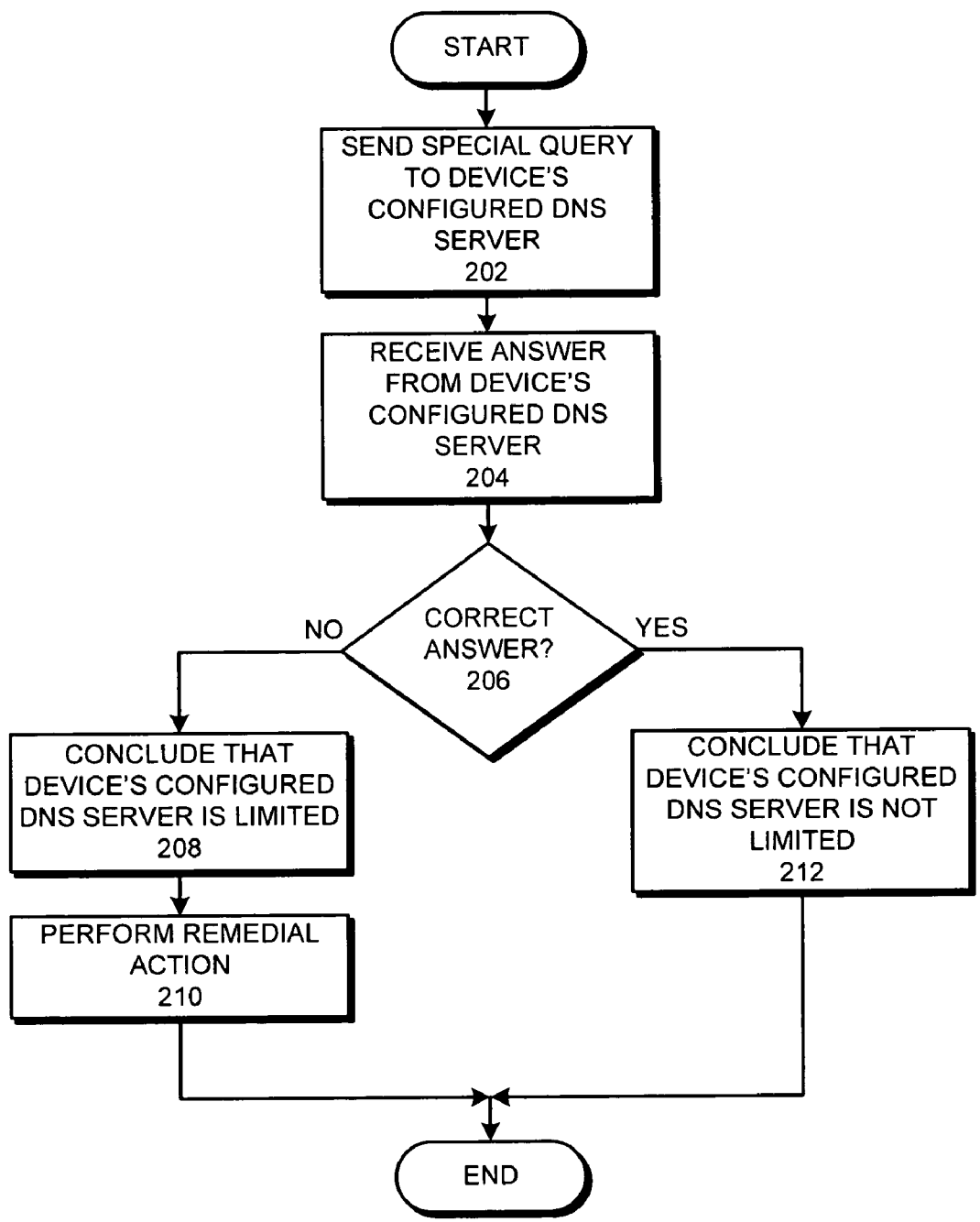
FIG. 2 presents a flow chart illustrating the process of determining if a configured DNS server suffers from a particular known functional limitation in accordance with an embodiment of the present invention.

FIG. 2 presents a flow chart illustrating the process of determining if a configured DNS server is functionally-limited in accordance with an embodiment of the present invention. The process begins when the system sends a special query to the configured DNS server (step 202). In one embodiment of the present invention, the special query is the PTR-type DNS query "1.0.0.127.dnsbugtest.1.0.0.127.in-addr.arpa."

Next the system receives an answer from the configured DNS server (step 204). If the answer is the correct response (step 206—YES), the system concludes that the configured DNS server is not functionally-limited (step 212). In one embodiment of the present invention, the correct response is an NXDOMAIN error code, which indicates that a domain name does not exist.

If the answer is incorrect (step 206—NO), the system concludes that the configured DNS server is functionally-limited (step 208) and performs a remedial action (step 210).

In one embodiment of the present invention, the remedial action involves taking steps to avoid performing those certain valid DNS queries that are believed to have a high likelihood of crashing that particular device.

In one embodiment of the present invention, the valid DNS queries to be avoided are those used by Wide-Area Bonjour, a networking technology that allows clients to discover network services on a wide-area network.

Note that the process described in FIG. 2 is stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

One embodiment of the present invention tests a domain-name (DNS) server to determine if the DNS server exhibits a functional limitation. A test query is transmitted to the DNS server. The test query is constructed to prompt a first response if the functional limitation exists on the DNS server, and a second response if the functional limitation does not exist on said DNS server. Next, a response to the test query is received from the DNS server. A determination is made as to whether the functional limitation exists on the DNS server.

One embodiment of the present invention evaluates the response of a local area network (LAN) domain-name server (DNS) coupled to a wide-area network (WAN) to a query of a type known to cause an undesired operation in some DNS servers. A test query is transmitted from a client on the LAN to the LAN DNS server. The query is constructed to generate a first response from the DNS server if the DNS server is of a configuration known to exhibit the undesired operation, and to generate a second response if the DNS server is not of a configuration known to exhibit the undesired response. Next, the response from the DNS server is received at a LAN client. A determination is made as to whether the DNS server is of a type known to exhibit the undesired operation. If so, a remedial action is performed at the client in response to the determination.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining if a domain name system (DNS) server is functionally limited, comprising:
sending an exploratory query that comprises "1.0.0.127.dnsbugtest.1.0.0.127.in-addr.arpa" to the DNS server, wherein the exploratory query is configured to detect an existence of a functional limitation in the DNS server without causing the DNS server to fail, and wherein the functional limitation causes the DNS server to:
receive the exploratory query, which comprises receiving both a first portion and a second portion of the exploratory query;
read only the first portion of the exploratory query;
based on reading only the first portion of the exploratory query, send an answer in response to the exploratory query;
receiving an answer to the exploratory query from the DNS server; and
if the answer indicates that a functional limitation exists in the DNS server, causing a remedial action to be performed.

2. The method of claim 1, wherein if the answer does not indicate that a functional limitation exists, the method further comprises concluding that the DNS server does not have the functional limitation that the exploratory query was configured to detect.

3. The method of claim 1, wherein the DNS server can include:
a DNS server;
a DNS cache; or
a DNS relay.

4. The method of claim 3, wherein the exploratory query is a "reverse lookup" DNS query which queries a PTR record.

5. The method of claim 4, wherein the exploratory query is configured so as to not cause the DNS server to communicate with a DNS root name server whether or not the functional limitation exists.

6. The method of claim 5, wherein the exploratory query is for a name that is known locally by the DNS server to have no records, without recourse to outside authority.

7. The method of claim 4, wherein if the answer to the exploratory query correctly indicates that a domain name specified in the exploratory query does not exist, the method further comprises concluding that the DNS server does not have the functional limitation that the exploratory query was constructed to detect.

8. The method of claim 1, wherein the remedial action involves disabling a networking feature in an application which would cause it to issue DNS queries that have the potential to crash the DNS server.

9. The method of claim 8, wherein the networking feature allows clients to discover network services on a wide area network.

10. A non-transitory computer-readable storage medium storing instructions that when executed by a computer cause the computer to perform a method for determining if a domain name system (DNS) server is functionally limited, the method comprising:
sending an exploratory query that comprises "1.0.0.127.dnsbugtest.1.0.0.127.in-addr.arpa" to the DNS server, wherein the exploratory query is configured to detect an existence of a functional limitation in the DNS server without causing the DNS server to fail, and wherein the functional limitation causes a DNS server to:
receive the exploratory query, which comprises receiving both a first portion and a second portion of the exploratory query;
read only the first portion of the exploratory query;
based on reading only the first portion of the exploratory query, send an answer in response to the exploratory query;
receiving an answer to the exploratory query from the DNS server; and if the answer indicates that a functional limitation exists in the DNS server, causing a remedial action to be performed.

11. The computer-readable storage medium of claim 10, wherein if the answer does not indicate that a functional limitation exists, the method further comprises concluding that the DNS server does not have the functional limitation that the exploratory query was configured to detect.

12. The computer-readable storage medium of claim 10, wherein the DNS server can include:
   a DNS server;
   a DNS cache; or
   a DNS relay.

13. The computer-readable storage medium of claim 12, wherein the exploratory query is a "reverse lookup" DNS query which queries a PTR record.

14. The computer-readable storage medium of claim 13, wherein the exploratory query is configured so as to not cause the DNS server to communicate with a DNS root name server whether or not the functional limitation exists.

15. The computer-readable storage medium of claim 14, wherein the exploratory query is for a name that is known locally by the DNS server to have no records, without recourse to outside authority.

16. The computer-readable storage medium of claim 13, wherein if the answer to the exploratory query correctly indicates that a domain name specified in the exploratory query does not exist, the method further comprises concluding that the DNS server does not have the functional limitation that the exploratory query was constructed to detect.

17. The computer-readable storage medium of claim 10, wherein the remedial action involves disabling a networking feature in an application which would cause it to issue DNS queries that have the potential to crash the DNS server.

18. The computer-readable storage medium of claim 17, wherein the networking feature is Wide Area Bonjour, which allows clients to discover network services on a wide area network.

19. An apparatus that determines if a domain name system (DNS) server is functionally limited, comprising:
   a testing mechanism comprising:
   a sending mechanism configured to send an exploratory query that comprises "1.0.0.127.dnsbugtest.1.0.0.127.in-addr.arpa" to the DNS server, wherein the an exploratory query is configured to detect an existence of a functional limitation in the DNS server, and wherein the functional limitation causes a DNS server to:
      receive the exploratory query, which comprises receiving both a first portion and a second portion of the exploratory query;
      read only the first portion of the exploratory query;
      based on reading only the first portion of the exploratory query, send an answer in response to the exploratory query;
   a receiving mechanism configured to receive an answer to the exploratory query from the DNS server; and
   an error handling mechanism configured to cause a remedial action to be performed if the answer indicates that a functional limitation exists in the DNS server.

20. The apparatus of claim 19, wherein if the answer does not indicate that a functional limitation exists, the testing mechanism concludes that the DNS server does not have the functional limitation that the exploratory query was configured to detect.

21. A method for testing a domain-name (DNS) server to determine if the DNS server exhibits a functional limitation, comprising:
   transmitting a test query that comprises "1.0.0.127.dnsbugtest.1.0.0.127.in-addr.arpa" to the DNS server, wherein the test query is configured to prompt a first response if the functional limitation exists on the DNS server, and a second response if the functional limitation does not exist on said DNS server, and wherein the functional limitation causes a DNS server to:
      receive the test query, which comprises receiving both a first portion and a second portion of the test query;
      read only the first portion of the test query;
      based on reading only the first portion of the test query, send an answer in response to the test query;
   receiving a response to the test query from the DNS server; and
   determining whether the functional limitation exists on the DNS server.

22. A method of evaluating the response of a local area network (LAN) domain-name server (DNS) coupled to a wide-area network (WAN) to a query of a type known to cause an undesired operation in some DNS servers, comprising:
   transmitting a test query that comprises "1.0.0.127.dnsbugtest.1.0.0.127.in-addr.arpa" from a client on the LAN to the LAN DNS server, wherein the query is configured to generate a first response from the DNS server if the DNS server is of a configuration known to exhibit the undesired operation, and to generate a second response if the DNS server is not of a configuration known to exhibit the undesired operation, and wherein the functional limitation causes the DNS server to:
      receive the test query, which comprises receiving both a first portion and a second portion of the test query;
      read only the first portion of the test query;
      based on reading only the first portion of the test query, send an answer in response to the test query;
   receiving a response from the DNS server at the LAN client;
   determining whether the DNS server is of a type known to exhibit the undesired operation; and
   if so, performing a remedial action at the client in response to the determination.

* * * * *